US011853142B2

(12) United States Patent
Herrington et al.

(10) Patent No.: US 11,853,142 B2
(45) Date of Patent: Dec. 26, 2023

(54) SENSOR-BASED USER DETECTION FOR ELECTRONIC DEVICES

(71) Applicant: Apple Inc., Cupertino, CA (US)

(72) Inventors: Andrew T. Herrington, San Francisco, CA (US); Andrew K. McMahon, San Carlos, CA (US); Salvador A. Valdes, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 17/331,928

(22) Filed: May 27, 2021

(65) Prior Publication Data

US 2021/0373643 A1 Dec. 2, 2021

Related U.S. Application Data

(60) Provisional application No. 63/030,957, filed on May 28, 2020.

(51) Int. Cl.
*G06F 3/041* (2006.01)
*G06F 1/3231* (2019.01)
(Continued)

(52) U.S. Cl.
CPC .......... *G06F 1/3231* (2013.01); *G06F 1/3265* (2013.01); *H04M 1/72454* (2021.01);
(Continued)

(58) Field of Classification Search
CPC ...... G06F 1/3231; G06F 1/3265; G06F 3/041; G06F 3/0412; G06F 3/044;
(Continued)

(56) References Cited

U.S. PATENT DOCUMENTS

2006/0145983 A1\* 7/2006 Lee ...................... G09G 3/3648
345/92
2007/0109433 A1 5/2007 Yamada et al.
(Continued)

OTHER PUBLICATIONS

European Patent Office (ISA/EP); Invitation to Pay Additional Fees, Partial International Search and Provisional Opinion, International; International Application No. PCT/US2021/034381; 9 pages; dated Sep. 8, 2021.
European Patent Office (ISA/EP), International Search Report and Written Opinion of the International Searching Authority, International Application No. PCT/US2021/034381, 15 pages, dated Oct. 29, 2021.

*Primary Examiner* — Pegeman Karimi
(74) *Attorney, Agent, or Firm* — Thompson Hine LLP (57) ABSTRACT

Various implementations disclosed herein include devices, systems, and methods implemented by an electronic device with an imaging sensor that includes both an arrangement of first pixels and a plurality of second pixels at or near the perimeter (e.g., in a surrounding rectangle) of the arrangement. In some implementations, the second pixels, which may be larger in size than the arrangement of first pixels, can be intermittently positioned, for example, with intervening space in between groups of one or more second pixels along the side columns, top rows, or bottom rows of the arrangement. In some implementations, detected movement in a physical environment is determined to correspond to a person approaching the electronic device based on data of the second pixels. In some implementations, detecting the person approaching the electronic device initiates a user verification process at the electronic device.

20 Claims, 10 Drawing Sheets

(51) Int. Cl.
*H04M 1/72454* (2021.01)
*G06F 1/3234* (2019.01)
*H04W 52/02* (2009.01)
*H04N 25/42* (2023.01)
*H04N 25/75* (2023.01)

(52) U.S. Cl.
CPC ............. H04N 25/42 (2023.01); H04N 25/75 (2023.01); H04W 52/0254 (2013.01); *H04M 2250/12* (2013.01)

(58) Field of Classification Search
CPC .......... H04M 1/72454; H04M 2250/12; H04N 25/42; H04N 25/75; H04N 25/702; H04N 25/704; H04W 52/0254
See application file for complete search history.

(56) References Cited

U.S. PATENT DOCUMENTS

| | | | |
|---|---|---|---|
| 2008/0048957 A1* | 2/2008 | Chiang | G09G 3/3607 345/87 |
| 2014/0009648 A1* | 1/2014 | Kim | H04N 25/42 348/272 |
| 2015/0065803 A1 | 3/2015 | Douglas et al. | |
| 2016/0013226 A1* | 1/2016 | Shim | H04N 25/771 257/432 |
| 2017/0339353 A1* | 11/2017 | Banachowicz | H04N 25/70 |
| 2018/0191982 A1 | 7/2018 | Berner et al. | |
| 2019/0268072 A1* | 8/2019 | Aoyama | H04B 10/116 |
| 2021/0011169 A1* | 1/2021 | Yang | G01S 17/894 |
| 2022/0166948 A1* | 5/2022 | Kelly | G01S 17/894 |

\* cited by examiner

SENSOR-BASED USER DETECTION FOR ELECTRONIC DEVICES

CROSS-REFERENCE TO RELATED APPLICATION

This Application claims the benefit of U.S. Provisional Application Ser. No. 63/030,957 filed May 28, 2020, which is incorporated herein in its entirety.

TECHNICAL FIELD

The present disclosure generally relates to systems, methods, and devices that use sensors, for example, to enable electronic devices.

BACKGROUND

In various circumstances, electronic devices enter sleep mode for confidentiality reasons, security reasons, or energy saving reasons. However, there is a need for improved wake-up or authentication methods or systems for electronic devices.

SUMMARY

Various implementations disclosed herein include devices, systems, and methods implemented by an electronic device with an imaging sensor that includes both an arrangement of first pixels and a plurality of second pixels on or near the perimeter (e.g., in a surrounding rectangle) of the arrangement of the first pixels. In some implementations, the plurality of second pixels, which may be different in pixel size than the arrangement of pixels, can be intermittently positioned, for example, with intervening space in between groups of one or more second pixels along the side columns, top rows, or bottom rows of the arrangement. In some implementations, including the plurality of second pixels in the same image sensor on the perimeter of the arrangement (e.g., matrix) of first pixels provides various advantages. In some implementations, the arrangement of first pixels and the plurality of second pixels on the perimeter of the arrangement in the image sensor both receive light through the same aperture and lens system. In some implementations, the electronic device provides power to the arrangement of first pixels and the second pixels on the perimeter independently. In some implementations, the first set of pixels is configured to operate in a standby mode and the second set of pixels is configured to activate the first set of pixels from the standby mode.

Various implementations disclosed herein include devices, systems, and methods for detecting that movement in a physical environment corresponds to a movement (e.g., a person approaching an electronic device) based on image data (e.g., event data). In some implementations, the image data used to detect a movement (e.g., an approaching person) enables detecting a person but does not able detection (e.g., identification) of a specific person. In some implementations, a single image sensor includes both an arrangement of first pixels and a plurality of second pixels on or near a perimeter of the arrangement (e.g., in a surrounding rectangle) that generate the event data. In some implementations, detecting a person approaching the electronic device activates a user verification process at the electronic device. In some implementations, the plurality of second pixels on the perimeter of the arrangement of first pixels constantly monitor the physical environment, and the user verification process is activated upon detection of a movement such as a person approaching the electronic device. In some implementations, a subset of event data (e.g., associated with portions of the physical environment outside a distance threshold from the electronic device) is not evaluated to determine whether the event data corresponds to a movement such as person approaching an electronic device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
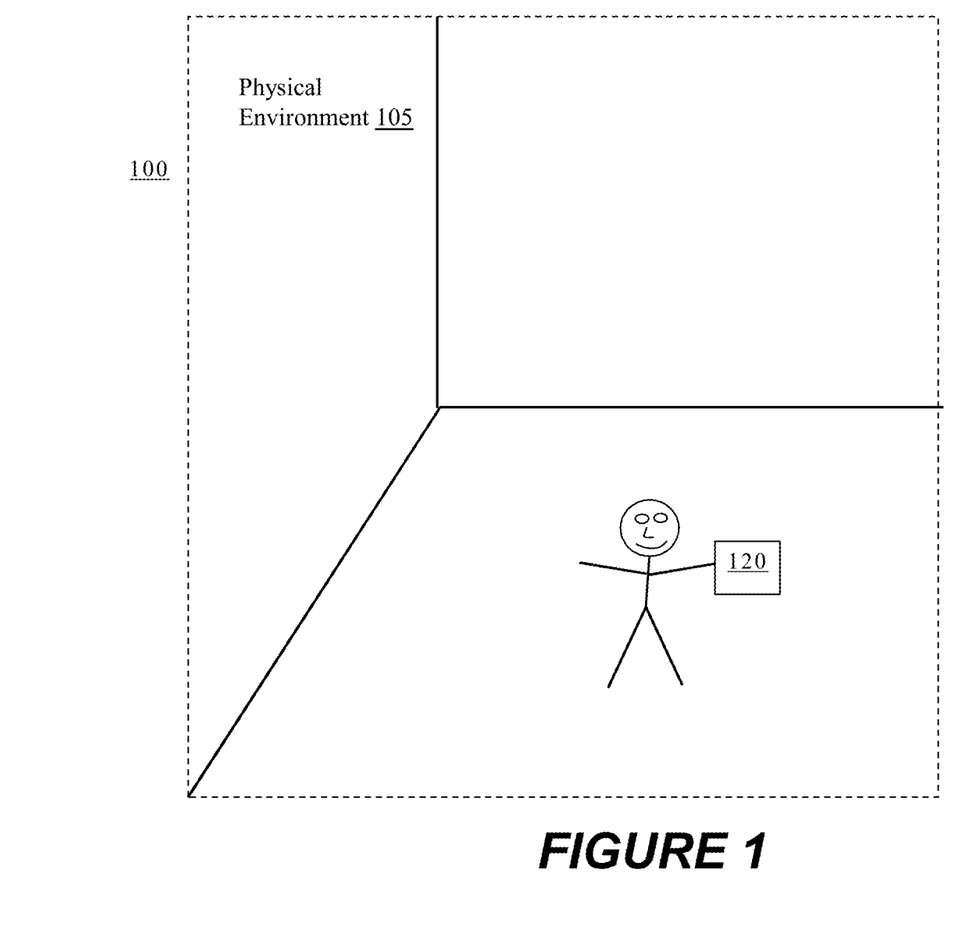
FIG. 1 is a block diagram of an example system in accordance with some implementations.

FIG. 1 is a block diagram of an example operating environment 100 in accordance with some implementations. As a non-limiting example, the operating environment 100 includes an electronic device (e.g., a laptop) 120, which may be in a physical setting 105.

Figure 2:
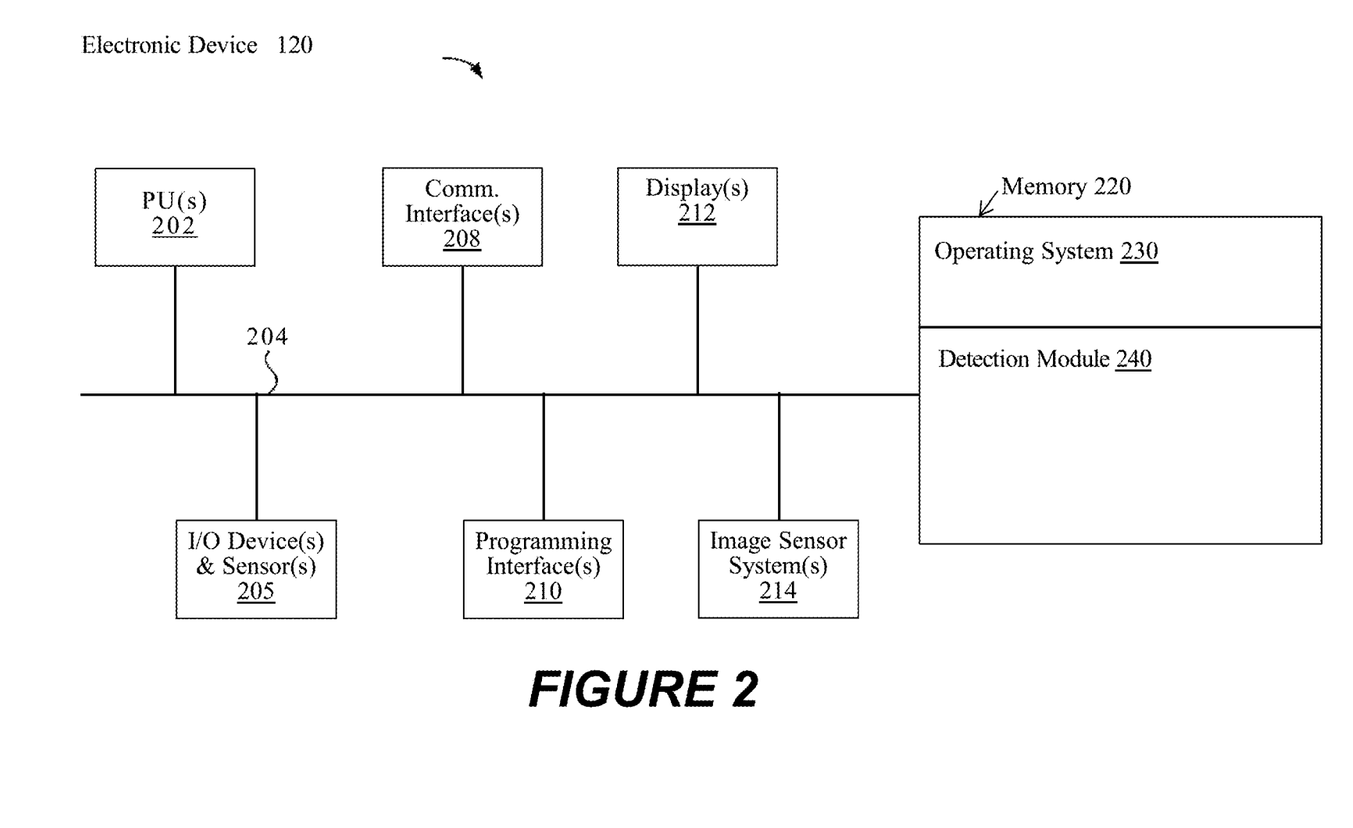
FIG. 2 is a block diagram of an example electronic device, in accordance with some implementations.

FIG. 2 is a block diagram of an example of an electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 202 (e.g., microprocessors, ASICs, FPGAs, GPUs, CPUs, processing cores, or the like), one or more input/output (I/O) devices and sensors 206, one or more communication interfaces 208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 210, one or more displays 212, one or more interior or exterior facing image sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 212 are configured to present content to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 212 correspond to diffractive, reflective, polarized, holographic, etc. waveguide displays. For example, the electronic device may include a single display. In another example, the electronic device may include a display for each eye of the user.

In some implementations, the one or more interior or exterior facing sensor systems 214 include an image capture device or array that captures image data or an audio capture device or array (e.g., microphone) that captures audio data. In some implementations, the one or more image sensor systems 214 are configured to obtain image data that corresponds to at least a portion of the face of the user that includes the eyes of the user. For example, the one or more image sensor systems 214 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 214 further include illumination sources that emit light (e.g., upon a subject or a portion of the face of the user) such as a flash or a glint source.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a detection module 240.

The operating system 230 includes procedures for handling various basic system services and for performing hardware dependent tasks. In some implementations, the detection module 240 is configured to implement a sensor that includes both an arrangement of illumination-intensity (e.g., RGB) pixels and a plurality of event camera pixels on or near the perimeter of the arrangement. In some implementations, the detection module 240 determines that movement in a physical environment corresponds to a person approaching the sensor based on event data of the plurality of event camera pixels.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Various implementations disclosed herein include devices, systems, and methods implemented by an electronic device with a sensor that includes both an arrangement of illumination-intensity (e.g., RGB) pixels and a plurality of event camera pixels on or near the perimeter (e.g., in a surrounding rectangle) of the arrangement. In some implementations, the plurality of event camera pixels, which may be asymmetrically larger in size than the pixels in the arrangement, can be intermittently positioned, for example, with intervening space in between groups of one or more event camera pixels along the side columns, top rows, or bottom rows. In some implementations, including the plurality of event camera pixels in the same image sensor on the perimeter of the arrangement of pixels with a time-based readout (i.e., accumulated light-intensity pixels) provides various advantages. In some implementations, the arrangement of pixels with a time-based readout and the plurality of event camera pixels on or near the perimeter of the arrangement in the image sensor both receive light through the same aperture and lens system. In some implementations, the electronic device provides power to the arrangement of pixels with a time-based readout and the event camera pixels at the perimeter of the arrangement independently. In some implementations, the pixels with a time-based readout are configured to operate in a standby mode and the event camera pixels are configured to activate the light intensity pixels from the standby mode.

In some implementations, a system includes a sensor including an arrangement (e.g., matrix) of a first set of pixels, each pixel of the first set of pixels configured to transfer a charge corresponding to accumulated light intensity detected by a corresponding photodetector of a first set of photodetectors. In some implementations, the sensor includes an arrangement of a second set of pixels at or near a periphery of the arrangement, each pixel of the second set of pixels configured to detect a change in light intensity exceeding a threshold at a corresponding photodetector of a second set of photodetectors.

Figure 3A:
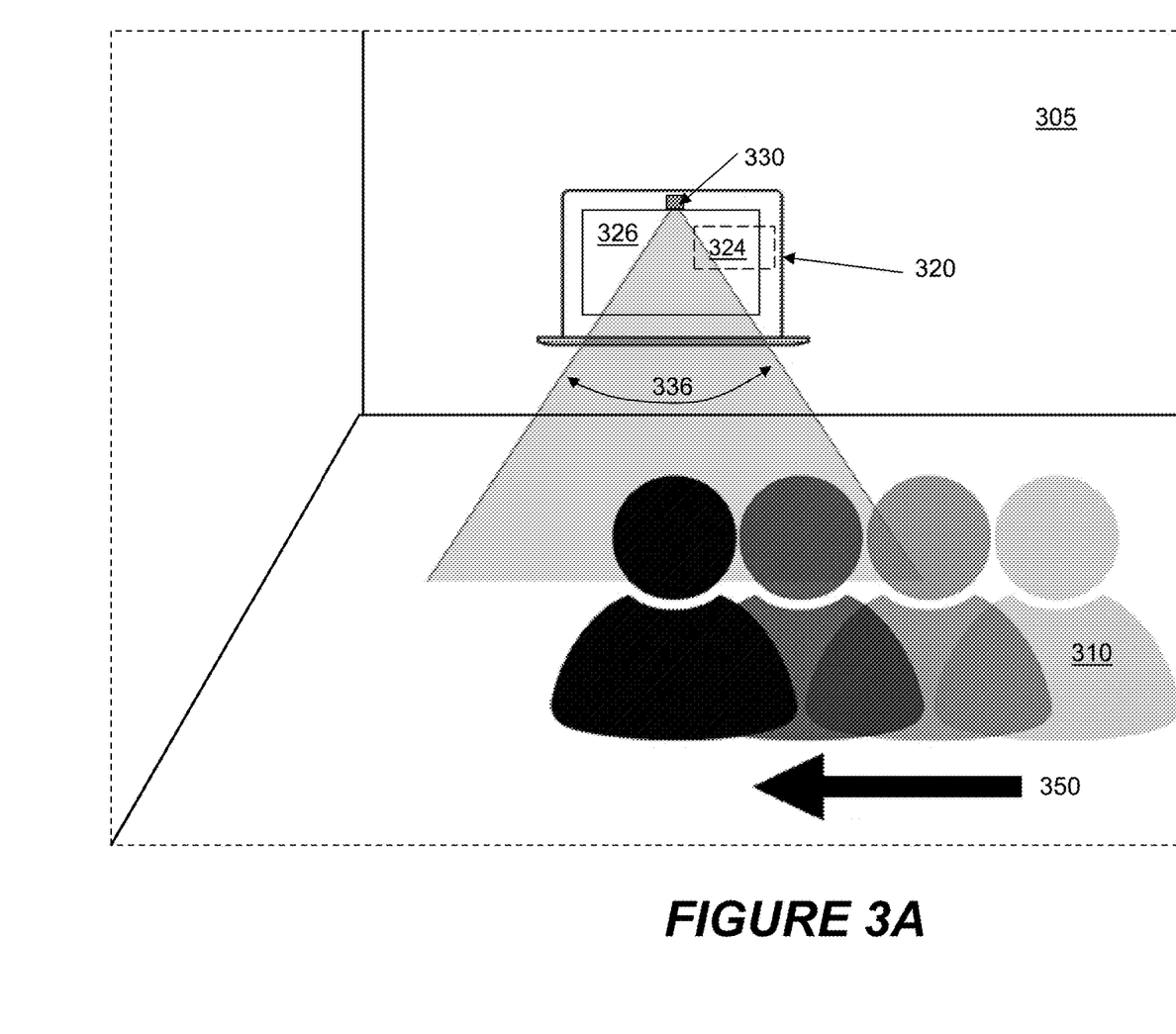
FIGS. 3A-3B are block diagrams of an example configuration of an electronic device including an image sensor with a standard frame camera portion and a plurality of event camera pixels around the periphery in accordance with some implementations.
Figure 3B:
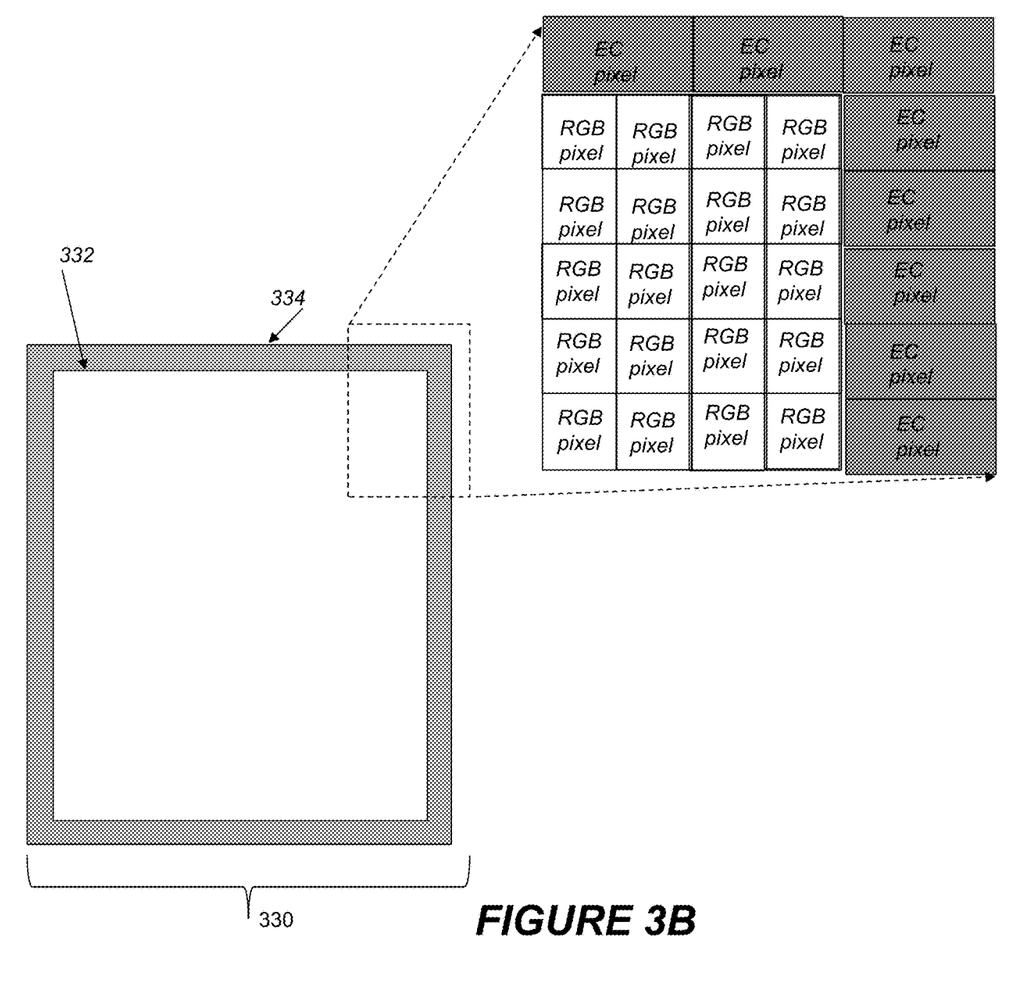

FIGS. 3A-3B are block diagrams of an example configuration of an electronic device including a sensor with a standard frame camera portion and a plurality of event camera or dynamic vision sensor (DVS) pixels around a portion of the periphery in accordance with some implementations. In some implementations, the sensor is used to detect a user of the electronic device. In some implementations, the user detection uses a low power configuration that enables a start-up screen on the electronic device.

As shown in FIG. 3A, an electronic device 320 in a physical environment 305 includes a processor 324 and a sensor 330. In As shown in FIG. 3B, the sensor 330 includes a frame camera portion 332 and an event camera portion 334, which is positioned adjacent (e.g., outside, nearby, touching, etc.) at least a part of the periphery of the frame camera portion 332. In some implementations, the event camera portion 334 includes a plurality of event camera pixels. In some implementations, the sensor 330 is operatively mounted on the electronic device 320. In some implementations, the sensor 330 is mounted on the electronic device 320 below, to the side, or above a display 326.

In some implementations, the sensor 330 is capable of detecting illumination intensity or contrast change using illumination intensity pixels and event camera pixels, respectively.

As shown in FIG. 3B, the sensor 330 includes the frame camera portion 332 surrounded by the event camera portion 334. In FIG. 3B, the frame camera portion 332 may be an RGB/RGB-D camera, and the event camera portion 334 may be a single line of event camera pixels surrounding the frame camera portion 332. In some implementations, the event camera pixels of the event camera portion 334 are larger than the RGB pixels of the frame camera portion 332. In some implementations, the sensor 330 has different sizes of event camera pixels in the event camera portion 334. In some implementations, the event camera pixels in the event camera portion 334 are not square. In some implementations, the event camera pixels in the event camera portion 334 are polygons, circles, or shapes elongated in at least one dimension on a regular, but at a different pitch than pixels of the frame camera portion 332. In some implementations, the sensor 330 has more than a single row of event camera pixels in the event camera portion 334. In some implementations, the sensor 330 has more than 50 rows of event camera pixels in the event camera portion 334. In some implementations, the event camera portion 334 is offset outside the frame camera portion 332.

As shown in FIG. 3A, an arrow 336 indicates a field of view (FOV) of the sensor 330. In some implementations, the FOV of the event camera portion 334 follows at least one edge of the FOV of the frame camera portion 332. In some implementations, the FOV of the frame camera portion 332 is a pyramid, and the FOV of the event camera portion 334 is a hollow pyramid. In some implementations, the FOV of the event camera portion 334 and the FOV of the frame camera portion 332 of the physical environment 305 are spatially correlated or overlap. In some implementations, frame camera data of the frame camera portion 332 and event camera data of the event camera portion 332 are temporally and spatially correlated. In some implementations, the sensor 330 may have a landscape orientation, a portrait orientation, or something in between. In some implementations, the sensor 330 (e.g., frame camera portion 332) may have other shapes, ellipse, hexagonal, or the like.

Figure 4A:
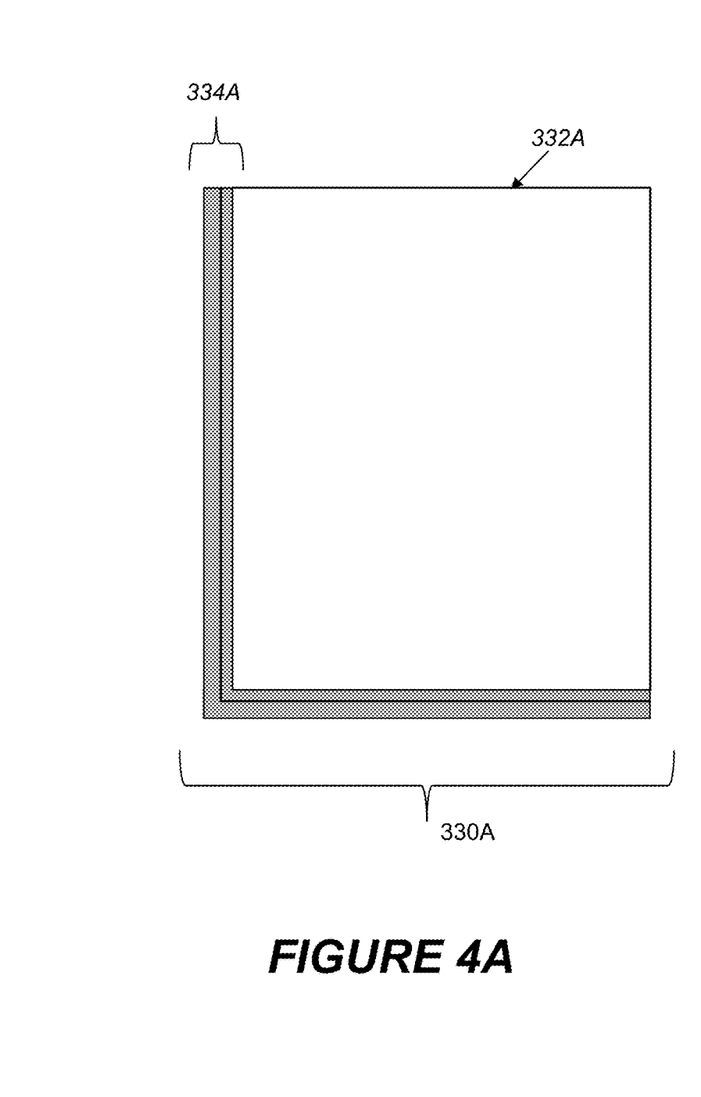
FIGS. 4A-4B are block diagrams of example configurations of the sensor of FIGS. 3A-3B in accordance with some implementations.

FIGS. 4A-4B are block diagrams of example configurations of the sensor 330 of FIGS. 3A-3B in accordance with some implementations. As shown in FIG. 4A, a sensor 330A includes a frame camera portion 332A partially surrounded by an event camera portion 334A. In FIG. 4A, the frame camera portion 332A is an RGA camera die, and the event camera portion 334A is 2 rows/2 column of event camera pixels along the left side and bottom side of the frame camera portion 332A. In some implementations, the FOV of the event camera portion 334A would match a left side and a bottom side of the FOV of the frame camera portion 332A.

Figure 4B:
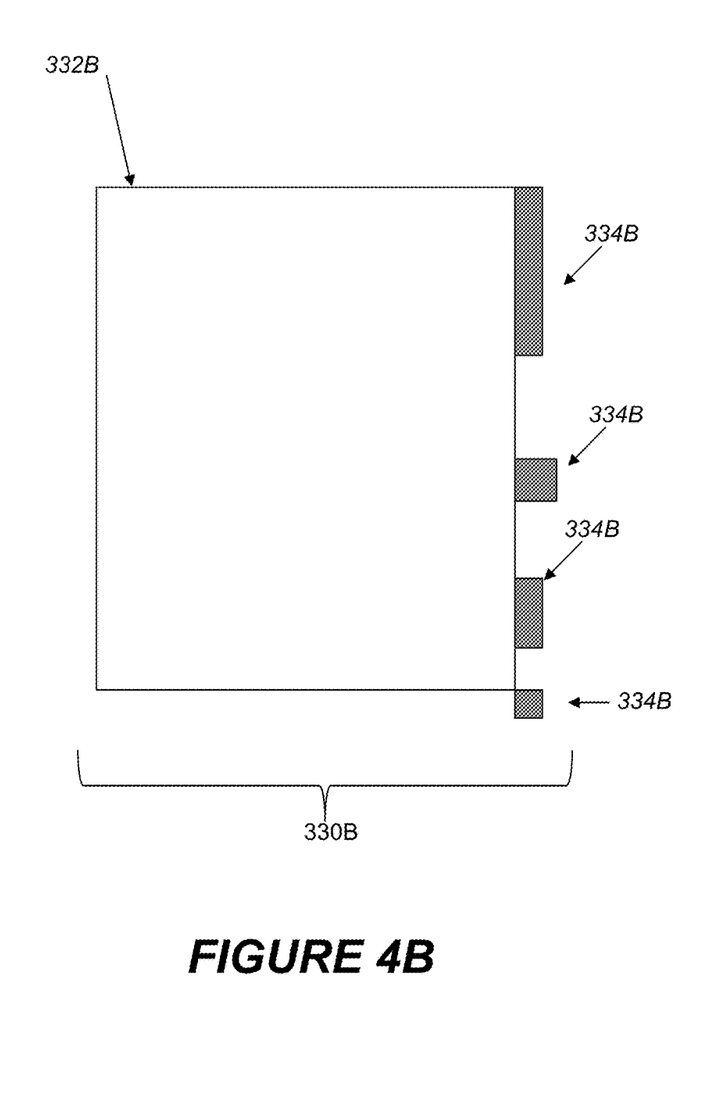

As shown in FIG. 4B, a sensor 330B includes the frame camera portion 332B partially surrounded by an event camera portion 334B. In FIG. 4B, the event camera portion 334B includes intermittent groups of one or more event camera pixels 334B that may be different sizes and extend along the right side of the frame camera portion 332B.

In some implementations, the event camera portion 334 is always on because of its low power consumption. In some implementations, the event camera portion 334 is a low power configuration because event camera pixels only draw current when contrast changes are detected. In some implementations, the event camera portion 334 operates at very high frame rates when monitoring the physical environment 305. In some implementations, the event camera portion 334 detects events faster than 1000 htz. Thus, the electronic device 320 can smoothly track a user 310 or a part of user 310 using the event camera portion 334 in the physical environment 305.

In some implementations, the sensor 330 is used to detect the approaching user of the electronic device 320. In some implementations, the sensor 330 has a detection system at the edge of the FOV of the frame camera portion 332 (e.g., the event camera portion 334). In some implementations, the FOV of the event camera portion 334 overlaps or extends inside of edges of the FOV of the frame camera portion 332 based on different sizes or characteristics of nearby pixels.

In some implementations, when the user 310 is going to sit in a chair in front of the electronic device 320, the user 310 will generally move in side to side (e.g., right-to-left 350 or left-to-right) and a moving object representing the user 310 is detected by the event camera portion 334. In some implementations, when the user 310 is going to use the electronic device 320, the user 310 will generally move in vertically (e.g., top-to-bottom or bottom-to-top), and a moving object representing the user 310 is detected by the event camera portion 334. For example, the user 310 may walk up and lean over the electronic device 320, or sit in a chair and roll up to the electronic device 320.

Figure 5A:
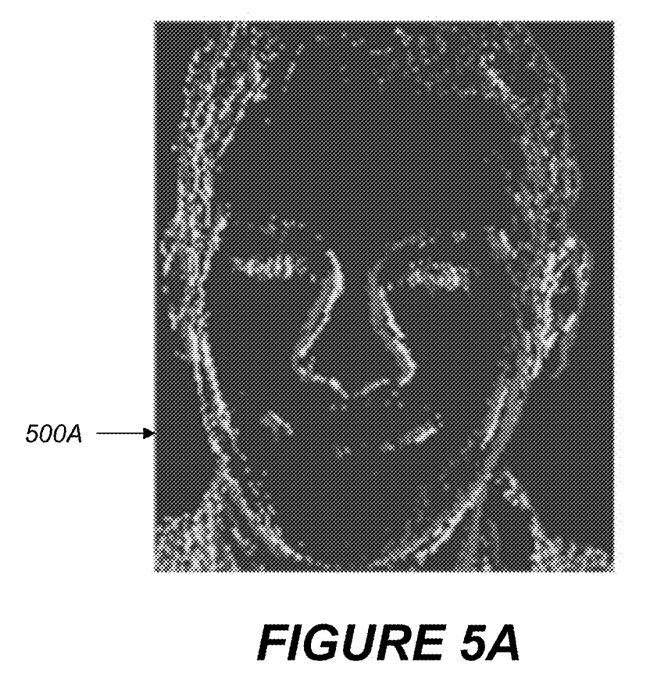
FIGS. 5A-5B are block diagrams illustrating event data of a person detected by event camera pixels in a sensor in accordance with some implementations.
Figure 5B:
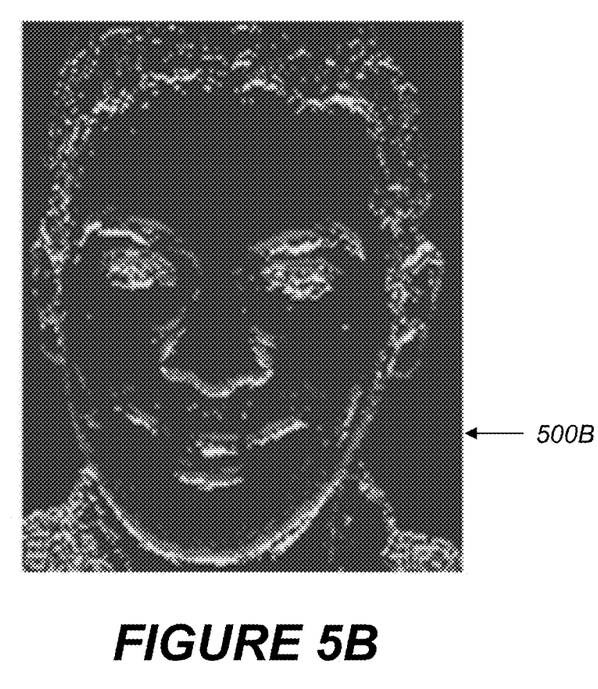

FIGS. 5A-5B are block diagrams illustrating event data of a person detected by event camera pixels in sensor in accordance with some implementations. As shown in FIG. 5A, event data 500A is caused by the person moving in side-to-side in front of the sensor 330 having a rectangular donut of event camera pixels in the event camera portion 334. As shown in FIG. 5B, event data 500B is caused by the person moving in top-to-bottom in front of the sensor 330 having the rectangular donut of event camera pixels in the event camera portion 334.

In some implementations, movements of objects into the FOV of the sensor 330 cause contrast changes that are detected by pixels as events in the event camera portion 334 that are determined over a time period and analyzed. In some implementations, the temporal event data is unpacked or unwrapped using the time components to (i) analyze patterns of movements of detected objects or to (ii) generate a 2D image. In some implementations, the temporal event data are designated for automated processing (e.g., machine viewing and not human viewing) to address privacy concerns.

In some implementations, these patterns of movements are tracked in a row or X direction (e.g., first direction) and tracked in a column or Y direction (e.g., second orthogonal direction) by the event camera portion 334. For example, movements of an object moving in a first direction (e.g., X/Y direction into across the FOV) may be used to determine relative velocity of the object, for example, by following a leading edge, or trailing edge, or a distinctive contrast element (e.g., buttons, badge, etc.) and corresponding events detected in the second orthogonal direction (e.g., Y/X direction) may be used to determine size of the object, for example, by following an upper edge, a lower edge, or the distinctive contrast element.

In some implementations, the patterns of movements of detected objects in the event data determine whether the detected moving object matches or correlates to speed, size, movement characteristics, or shape characteristics of an approaching person. In some implementations, the patterns of movements of detected objects in the event data are compared with known profiles of approaching person movements. In some implementations, the patterns of movements of detected objects in the event data are compared using frequency domain representations (e.g., Fourier transform) that may repeat as a function of time.

In some implementations, the sensor 330 or the electronic device 320 are configured to specifically use hardware, firmware, or software to prevent event data from being stored, forwarded, or otherwise used by the electronic device except for the specific purpose of detecting an approaching person as described herein.

In some implementations, the patterns of movements of detected objects in the event data are compared using Machine Learning (ML). ML methods for object detection include machine learning-based approaches or deep learning-based approaches. In some implementations, machine learning approaches first define features from a set of data that contains both the inputs and the desired outputs, then uses a classification technique to identify an object. In some implementations, deep learning techniques do end-to-end object detection without specifically defining features, for example, using convolutional neural networks (CNN). In some implementations, the patterns of movements of detected objects in the event data used to detect an approaching person is designated for automated processing (e.g., machine analysis and not human analysis) to address privacy concerns.

In some implementations, when the moving object is determined to be a person (e.g., approaching the electronic device) using the event camera portion 334, a user verification process or verification system of the electronic device 320 is activated. In some implementations, when the object is determined to be an approaching person, an element of the electronic device 320 is activated. In some implementations, when the object is determined to be an approaching person, a UI (e.g., touchscreen UI, fingerprint ID, etc.), any software based login, or hardware based login of the electronic device 320 is activated. In some implementations, an IR camera of the electronic device 320 is activated for face verification, and when the approaching person is identified as the user 310 of the electronic device via IR, a home screen is enabled, preferably before the user 310 is able to touch the electronic device. In some implementations, a start-up time before the user 310 is able to use the electronic device 320 is reduced or eliminated. In some implementations when the object is determined to be an approaching person, the RGB pixels of the sensor 330 are activated for face verification (e.g., the green corresponding security light is lit), and the home screen is enabled when the person is identified to be the user 310 (e.g., before reaching the electronic device 320). In some implementations, a login UI (e.g., start screen with a password prompt) of the electronic device 320 is activated for user verification.

Figure 6:
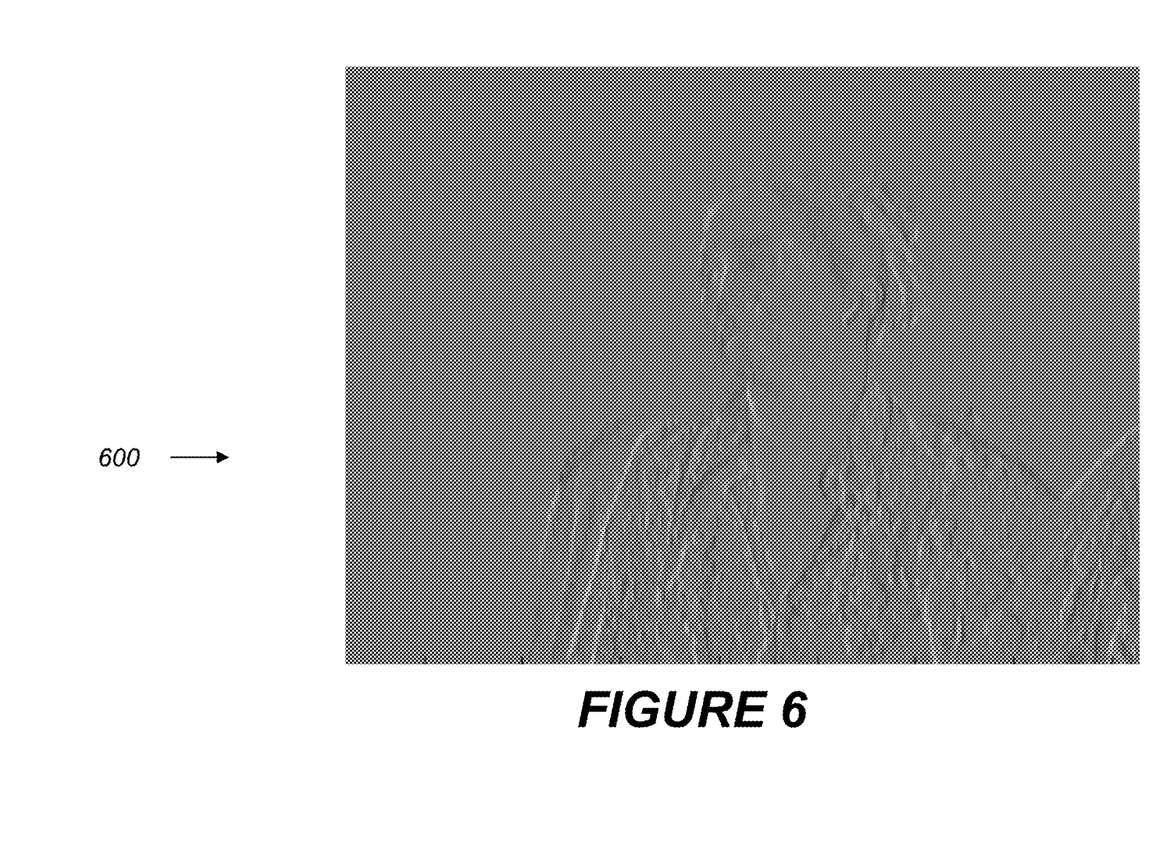
FIG. 6 is a block diagram illustrating a 2D image of an object generated using event data captured over time by event camera pixels extending in at least a first direction in a sensor in accordance with some implementations.

FIG. 6 is a block diagram illustrating a 2D image of an object generated using event data captured over time by event camera pixels extending in at least a first direction in a sensor in accordance with some implementations. In some implementations, a 2D image 600 is generated using event data captured over time by at least one row or column of event camera pixels. In some implementations, the 2D image 600 is generated using is generated using combined event data captured over time using a combination of upper side, lower side, left side, and right side event camera pixels in the sensor 330. As shown in FIG. 6, the 2D image is generated using Y-axis event camera pixels generated over time and evaluated based on corrected event camera data from event camera pixels extending in an X-axis orthogonal direction. In some implementations, the person approaching the electronic device is detected based on the 2D image 600. In some implementations, the information from a leading event edge on one axis is used to unwrap the information obtained using the orthogonal axis.

In some implementations, the sensor 330 is used to detect and ignore, moving objects, approaching objects, or other people that do not approach the electronic device 320 in the physical environment 305.

In some implementations, events associated objects within a distance threshold or range to the electronic device 320 are evaluated to determine whether the object is a person. In some implementations, the objects (e.g., people) outside the distance threshold from the electronic device 320 are not evaluated.

In some implementations, corresponding shielded event camera pixels (e.g., in the event camera portion 334) sharing a lens determine whether to evaluate a moving object near the electronic device 320. In some implementations, two paired shielded event camera pixels (e.g., paired in x-axis, paired in y-axis, paired in four or more pixels, etc.) sharing a single lens are used to determine when to evaluate a moving object near the electronic device 320. In some implementations, phase detection based on event data from the paired shielded event camera pixels is used to determine coarse distance to the moving object. In some implementations, phase detection using a spatial temporal contrast detection difference for event detection of two paired shielded event camera pixels determines whether the moving object is outside a focal distance of the event camera pixels or a focal plane of the sensor 330.

For example, when the paired shielded event camera pixels using a single lens (e.g., microlens) are in the same column, one event camera pixel is shielded (e.g., 10%, 20%, 30%, 40%, 50%) on the left side and the other event camera pixel is shielded (e.g., 10%, 20%, 30%, 40%, 50%) on the right side. In this example, for an object moving side-to-side, there will be a time-correlated contrast change (e.g., event) difference based on how far away the moving object is from the sensor 330. Further in this example, moving object at the focal plane of the event camera pixels will experience the same light intensity or the same light intensity rate in generating an event in the paired shielded event camera pixels. Accordingly, the paired shielded event camera pixels of the event camera portion 334 can be used to determine at least whether the moving object is outside or inside the focal plane (e.g., the distance threshold).

In some implementations, the distance threshold from the electronic device 320 is set relative to the focal plane. In some implementations, the focal plane of the paired shielded event camera pixels using a single lens is set based on a selected distance threshold from the electronic device 320.

Figure 7:
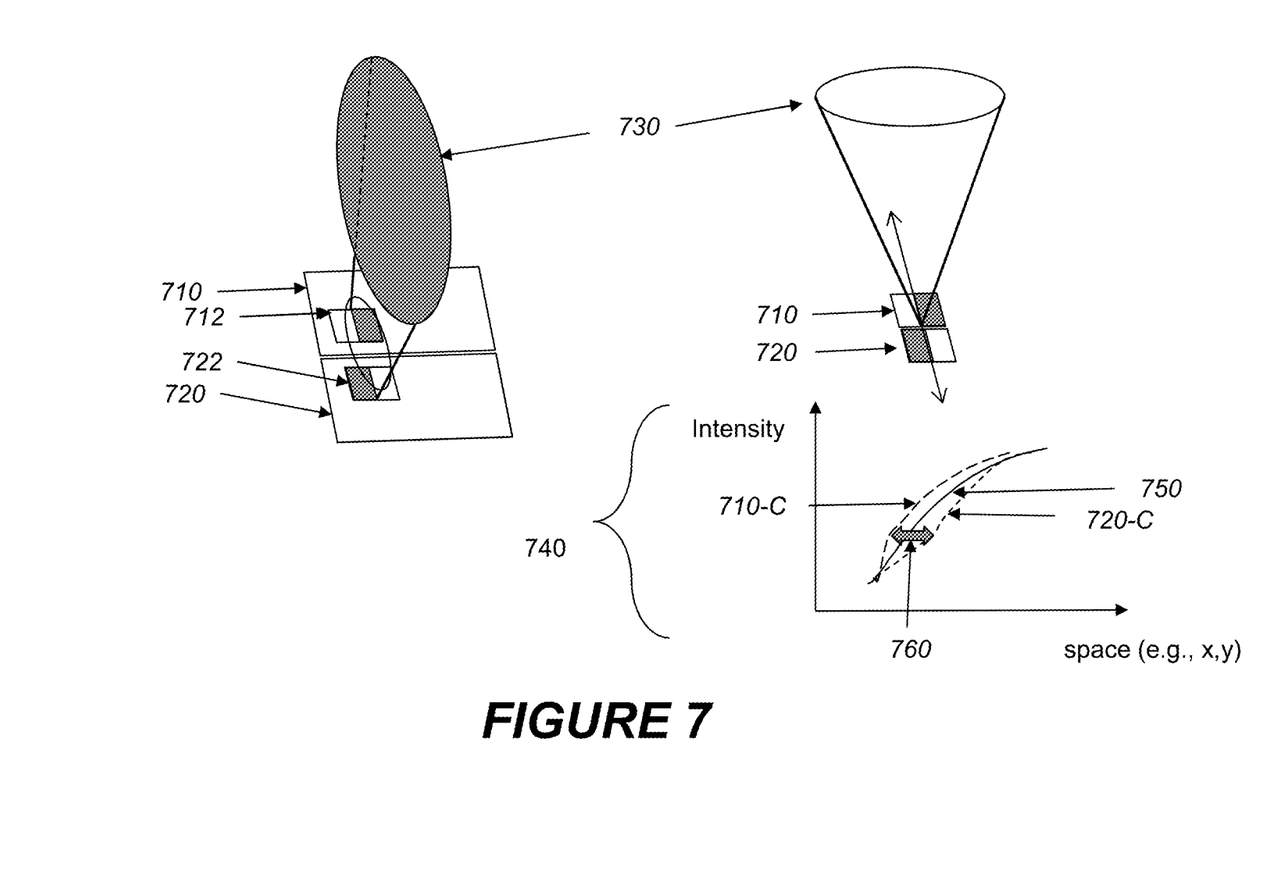
FIG. 7 is a block diagram illustrating two paired shielded event camera pixels using a single lens in accordance with some implementations.

FIG. 7 is a block diagram illustrating two paired shielded event camera pixels using a single lens in accordance with some implementations. As shown in FIG. 7, a first event camera pixel 710 including a photodetector 712 (e.g., photodiode) with impinging light blocked for 50% of the right side and a second event camera pixel 720 including a photodetector 722 with impinging light blocked for 50% of the left side. The first event camera pixel 710 and the second event camera pixel 720 are a single column in the event camera portion 334 and share a single lens 730. In some implementations, the first and second event camera pixels 710, 720 each receives ½ of the cone of light from the lens 730.

As shown in FIG. 7, a plot 740 illustrates intensity on the Y-axis and space represented by x,y on the horizontal axis for the paired shielded the first and second event camera pixels 710, 720. The plot 740 shows exemplary spatial intensity contrast curves for the first event camera pixel 710 (710-C), the second event camera pixel 720 (720-C), and an unshielded event camera pixel of the same size and location (750). As shown in the plot 740, when an object moving right-to-left causes an event to be detected, the first event camera pixel 710 detects the event earlier and the second event camera pixel 720 pixel detects the event later, and a spatial temporal contrast difference 760 between the curves (e.g., 710-C and 720-C) is based on a distance Z.

Further, in some implementations, an inversion occurs at the focal distance (e.g., focal plane of the sensor 330 or event camera pixels 334). Accordingly, as shown in FIG. 7, for an object moving right-to-left that causes an event to be detected by the first and second event camera pixels 710, 720, the first event camera pixel 710 detects the event first inside the focal distance and the second event camera pixel 720 pixel detects the event first outside the focal distance (e.g., inversion). Thus, in some implementations, time-correlated contrast change detections (e.g., event) are used to determine how far away the moving object is from the first and second event camera pixels 710, 720.

As shown in FIG. 3A, event camera data corresponds to light reflected from the physical environment 305 and received at the event camera portion 334. In some implementations, the event camera data corresponds to the light reflected and received at the event camera portion 334 in a first wavelength band. In some implementations, the event camera portion 334 is tuned (e.g., using a filtered light source or filters at the light source or the event camera) to the first wavelength band. In some implementations, the event camera portion 334 uses IR light or NIR light (e.g., from an IR or NIR light source like an LED. As shown in FIG. 3A, frame camera data corresponds to light (e.g., visible light) reflected from the physical environment 305 and received at the frame camera portion 332. In some implementations, the frame camera data corresponds to the light reflected and received at the frame camera portion 332 in a second wavelength band (e.g., visible light).

Various implementations disclosed herein include devices, systems, and methods for detecting that movement in a physical environment corresponds to a person approaching an electronic device based on event data in accordance with some implementations. In some implementations, a single sensor that includes both a matrix of pixels with a time-based readout (e.g., RGB pixels) and a plurality of event camera pixels on a perimeter of the matrix (e.g., in a surrounding rectangle) generate the event data. In some implementations, detecting the person approaching the electronic device activates a user verification process at the electronic device. In some implementations, the plurality of event camera pixels on the perimeter of the matrix constantly monitor the physical environment, and the respectively higher-power user verification process is activated when detecting the person approaching the electronic device. In some implementations, movement outside a distance threshold from the electronic device are not evaluated to determine whether that movement corresponds to a person approaching an electronic device.

In some implementations, at an electronic device having a processor and an image sensor including a set of pixels, event data is received from the set of pixels, the event data corresponding to events in a physical environment during which pixels of the set of pixels detected changes in light intensity exceeding a threshold. In some implementations, a person is detected approaching the electronic device in the physical environment based on the event data, and an element of the electronic device is activated based on detecting the person approaching the electronic device.

Figure 8:
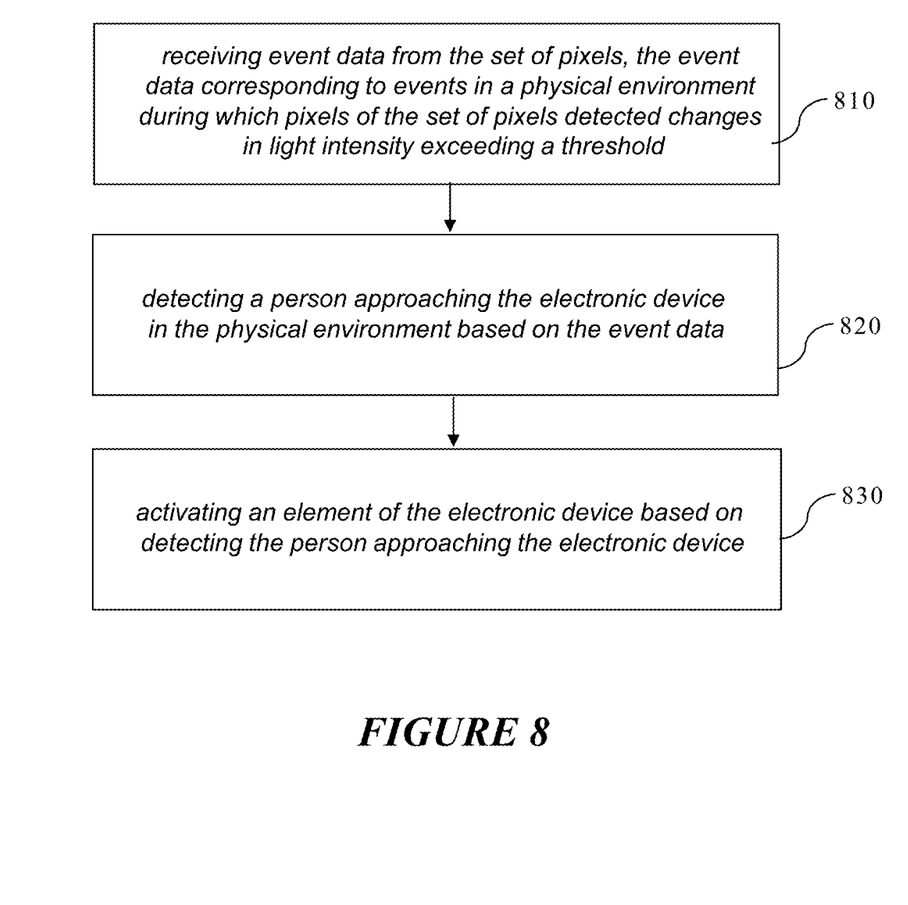
FIG. 8 is a flowchart illustrating an exemplary method for detecting that movement in a physical environment corresponds to a person approaching an electronic device based on event data in accordance with some implementations.

FIG. 8 is a flowchart illustrating an exemplary method for detecting that movement in a physical environment corresponds to a person approaching an electronic device based on event data in accordance with some implementations. In some implementations, the method 800 is performed by a device (e.g., electronic device 120 of FIGS. 1-3). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 receives event data from an electronic device having a sensor including a set of pixels, the event data corresponding to events in a physical environment during which pixels of the set of pixels detected changes in light intensity exceeding a threshold. In some implementations, the sensor is a camera that includes both an arrangement (e.g., matrix or rectangular grid) of pixels with a time-based readout (e.g., RGB pixels) and the set of pixels are event camera pixels (e.g., contrast change detection for events) on or near at least a part of a perimeter of the arrangement of pixels with a time-based readout (e.g., in an "L-shape" or a surrounding hollow rectangle) that generate the event data. In some implementations, the arrangement of pixels with a time-based readout and the event camera pixels on the perimeter of the arrangement in the image sensor both receive light through the same aperture and lens system. In some implementations, the arrangement of pixels with a time-based readout forms a single monolithic sensor (e.g., die). In some implementations, the arrangement of pixels with a time-based readout and the event camera pixels on or near the perimeter of the arrangement form a single rectangular monolithic sensor. In some implementations, the event data corresponds to pixel events triggered based on changes in light intensity (e.g., contrast) at the event camera pixels exceeding a comparator threshold.

At block 820, the method 800 detects a person approaching the electronic device in the physical environment based on the event data. In some implementations, the person is detected using patterns of events tracked over time in the event data. In some implementations, the person is detected using movement patterns associated with people approaching the electronic device (e.g. side-to-side or bottom-to-top tracked over time) that are detected in the event data. In some implementations, the person is detected using frequencies, sizes, or shapes associated with people as opposed to other types of objects tracked over time in the event data. In some implementations, the person is detected using ML-based object recognition using the event data. In some implementations, the event data used to detect an approaching person is designated for automated processing (e.g., machine analysis and not human analysis) to address privacy concerns.

At block 830, the method 800 activates an element of the electronic device based on detecting the person approaching the electronic device. In some implementations, when the person is detected approaching the electronic device using the event data, a user verification process or user verification system of the electronic device is activated. In some implementations, an IR camera of the electronic device is activated for face verification, and when the person is identified as the user of the electronic device, a home screen is enabled, preferably before the user is able to touch the electronic device so that the time spent by the user waiting to use the electronic device is reduced or eliminated. In some implementations, the RGB pixels of the sensor 330 are activated for face verification (e.g., the green corresponding security light is lit). In some implementations, a login UI (e.g., start screen with a password prompt) of the electronic device is activated for user verification.

In some implementations, the electronic device provides power to the arrangement of pixels with a time-based readout and the event camera pixels on or near the perimeter of the arrangement independently. In some implementations, the event camera pixels on the perimeter of the arrangement of pixels with a time-based readout constantly monitor the physical environment, and the respectively higher-power user verification process is triggered when detecting the person approaching the electronic device.

In some implementations, the event camera pixels at the perimeter of the arrangement of pixels with a time-based readout generate a 2D image of an object in the physical environment, and the person approaching the electronic device is detected based on the 2D image. In some implementations, the 2D image is generated using event data from a first direction (e.g., x-axis event camera pixels) for object movement, and event data from an orthogonal direction (e.g., y-axis event camera pixels) over time to determine an associated temporal component, which in combination, are used to generate the 2D image.

In some implementations, detecting the person approaching the electronic device is based upon whether events of the event data correspond to portions of the physical environment that are within the threshold distance from the electronic device. In some implementations, the event data used to determine distance is from neighboring paired event camera pixels of the set of pixels that share a single lens. In some implementations, detecting a distance is based on an asymmetric response of event data of the paired shielded pixels. In some implementations, the paired shielded event camera pixels implement phase detection based on a focal plane to determine the distance threshold. For example, a first pixel of the paired shielded pixels is 50% shielded from a first direction and a second pixel of the paired shielded pixels is 50% shielded from a second direction opposite to the first direction, and the distance is based on a phase difference of event detection by the paired shielded pixels and a focal plane of the paired shielded pixels.

Figure 9:
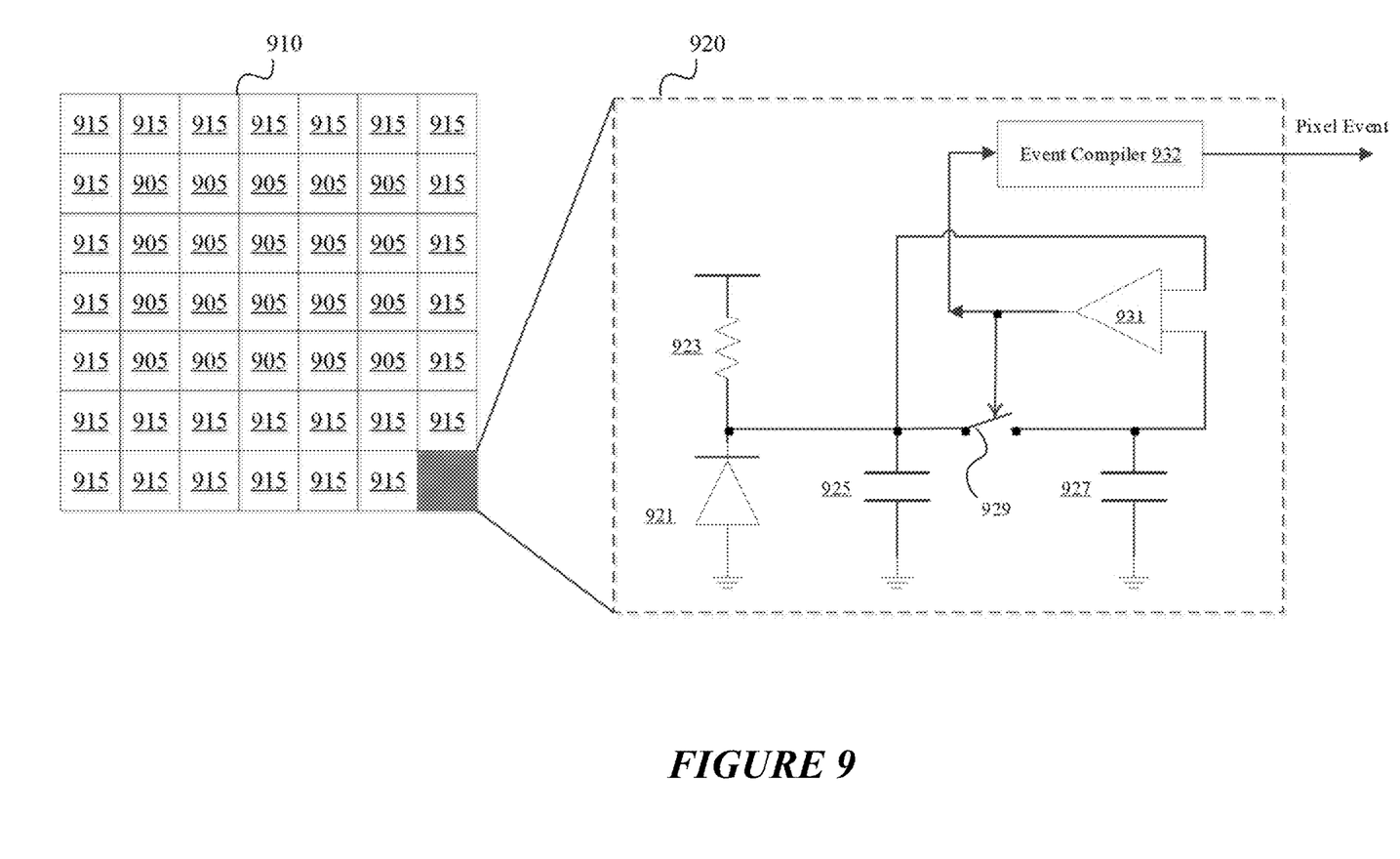
FIG. 9 is a block diagram of pixel sensors for an event camera and an example circuit diagram of a pixel sensor, in accordance with some implementations.

FIG. 9 is a block diagram of pixel sensors for an example event camera circuit diagram of a pixel sensor, in accordance with some implementations. As illustrated by FIG. 9, event pixels 915 and RGB pixels 905 may disposed on a camera at known locations relative to an electronic device (e.g., the electronic device 120 of FIG. 1) by arranging a matrix 910 of rows and columns. In the example of FIG. 9, each of the pixel sensors 915 is associated with an address identifier defined by one row value and one column value.

FIG. 9 also shows an example circuit diagram of a circuit 920 that is suitable for implementing a pixel sensor 915. In the example of FIG. 9, circuit 920 includes photodiode 921, resistor 923, capacitor 925, capacitor 927, switch 929, comparator 931, and event compiler 932. In operation, a voltage develops across photodiode 921 that is proportional to an intensity of light incident on the pixel sensor. Capacitor 925 is in parallel with photodiode 921, and consequently a voltage across capacitor 925 is the same as the voltage across photodiode 921.

In circuit 920, switch 929 intervenes between capacitor 925 and capacitor 927. Therefore, when switch 929 is in a closed position, a voltage across capacitor 927 is the same as the voltage across capacitor 925 and photodiode 921. When switch 929 is in an open position, a voltage across capacitor 927 is fixed at a previous voltage across capacitor 927 when switch 929 was last in a closed position. Comparator 931 receives and compares the voltages across capacitor 925 and capacitor 927 on an input side. If a difference between the voltage across capacitor 925 and the voltage across capacitor 927 exceeds a threshold amount ("a comparator threshold"), an electrical response (e.g., a voltage) indicative of the intensity of light incident on the pixel sensor is present on an output side of comparator 931. Otherwise, no electrical response is present on the output side of comparator 931.

When an electrical response is present on an output side of comparator 931, switch 929 transitions to a closed position and event compiler 932 receives the electrical response. Upon receiving an electrical response, event compiler 932 generates a pixel event and populates the pixel event with information indicative of the electrical response (e.g., a value or polarity of the electrical response). In one implementation, event compiler 932 also populates the pixel event with one or more of: timestamp information corresponding to a point in time at which the pixel event was generated and an address identifier corresponding to the particular pixel sensor that generated the pixel event.

An event camera generally includes a plurality of pixel sensors like pixel sensor 915 that each output a pixel event in response to detecting changes in light intensity that exceed a comparative threshold. When aggregated, the pixel events output by the plurality of pixel sensor form a stream of pixel events that are output by the event camera. In some implementations, light intensity data obtained from the stream of pixel events output by an event camera is used to implement various applications. When the event camera is disposed on one device among a first electronic device and a second electronic device, at least a portion of the changes in light intensity correspond to light emitted by a one or more of optical sources disposed on the other device among the first electronic device and the second electronic device.

Numerous specific details are set forth herein to provide a thorough understanding of the subject matter. However, those skilled in the art will understand that the subject matter may be practiced without these specific details. In other instances, methods apparatuses, or systems that would be known by one of ordinary skill have not been described in detail so as not to obscure subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting. As used in the description of the implementations, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A system comprising:
   an arrangement of a first set of pixels that are grouped together, the first set of pixels comprising a first set of photodetectors, each pixel of the first set of pixels comprising a first pixel type configured to transfer a charge corresponding to accumulated light intensity detected by a corresponding photodetector of the pixel; and
   an arrangement of a second set of pixels comprising a second set of photodetectors, the second set of pixels comprising a second pixel type, the arrangement of the second set of pixels at or near a periphery of the arrangement of the first set of pixels, each pixel of the second set of pixels configured to detect a change in light intensity from a corresponding photodetector of the pixel that exceeds a threshold.

2. The system of claim 1 further comprising a lens system, wherein the first set of pixels and the second set of pixels are configured to receive light via the lens system.

3. The system of claim 1 further comprising a housing having an aperture, wherein the first set of pixels and the second set of pixels are configured to receive light through the aperture.

4. The system of claim 1, wherein the arrangement of the second set of pixels comprises pixels adjacent to a first edge of the arrangement.

5. The system of claim 1, wherein the arrangement of the second set of pixels comprises pixels adjacent to two opposite edges of the arrangement of the first set of pixels.

6. The system of claim 1, wherein the pixels of the second set of pixels are intermittently positioned adjacent at least one row or column of pixels of the arrangement of the first set of pixels.

7. The system of claim 1, wherein the arrangement of the second set of pixels comprises pixels adjacent to two perpendicular edges of the arrangement.

8. The system of claim 1, wherein the arrangement of the first set of pixels has a first edge parallel to a second edge and a third edge parallel to a fourth edge, wherein the arrangement of the second set of pixels comprises pixels surrounding the first edge, second edge, third edge, and fourth edge.

9. The system of claim 1, wherein the system provides power to the first set of pixels and the second set of pixels independently.

10. The system of claim 9, wherein:
the first set of pixels is configured to operate in a standby mode; and
the second set of pixels is configured to activate the first set of pixels from the standby mode.

11. A method comprising:
at an electronic device having a processor and a camera comprising a set of pixels that includes a grouped together arrangement of a first set of pixels comprising a first set of photodetectors and an arrangement of a second set of pixels comprising a second set of photodetectors, the first set of pixels comprising a first pixel type and the second set of pixels comprising a second pixel type, the arrangement of the second set of pixels at or near a periphery of the grouped together arrangement of the first set of pixels:
receiving event data from the set of pixels, the event data corresponding to events in a physical environment during which pixels of the second set of pixels detected changes in light intensity exceeding a threshold;
detecting a movement in the physical environment based on the event data; and
activating an element of the electronic device based on detecting the movement.

12. The method of claim 11, wherein activating the element comprises activating pixels, of the set of pixels, with a time-based readout of the camera, wherein the set of pixels is located outside the periphery of the grouped together arrangement of the first set of pixels with a time-based readout.

13. The method of claim 11, wherein activating the element comprises activating an infrared camera of the electronic device.

14. The method of claim 11, wherein activating the element comprises initiating an application or login user interface on the electronic device.

15. The method of claim 11, wherein detecting the movement comprises determining that the movement corresponds to a person approaching based on identifying a pattern of movement, identifying object size, or identifying object velocity content based on the event data.

16. The method of claim 11, wherein detecting the movement comprises:
generating a two-dimensional (2D) image of an object in the physical environment; and
detecting a person approaching the electronic device based on the 2D image.

17. The method of claim 11, wherein detecting the movement is based upon whether events of the event data correspond to portions of the physical environment that are within the threshold distance from the electronic device.

18. The method of claim 17, wherein the set of pixels comprises paired shielded pixels that share a single lens, the method further comprising:
detecting a distance based on an asymmetric response of event data of the paired shielded pixels.

19. The method of claim 18, wherein a first pixel of the paired shielded pixels is 50% shielded from a first direction and a second pixel of the paired shielded pixels is 50% shielded from a second direction opposite to the first direction, and wherein the distance is based on a phase difference of event detection by the paired shielded pixels and a focal plane of the paired shielded pixels.

20. A non-transitory computer-readable storage medium, storing program instructions computer-executable on a computer to perform operations comprising:
receiving event data from a set of pixels that includes a grouped together arrangement of a first set of pixels comprising a first set of photodetectors and an arrangement of a second set of pixels comprising a second set of photodetectors, the event data corresponding to events in a physical environment during which pixels of the second set of pixels detected changes in light intensity exceeding a threshold, the first set of pixels comprising a first pixel type and the second set of pixels comprising a second pixel type, the arrangement of the second set of pixels at or near a periphery of the grouped together arrangement of the first set of pixels;
detecting a movement in the physical environment based on the event data; and
activating an element of the electronic device based on detecting the movement.

* * * * *